US012706848B2

(12) United States Patent
Sun et al.

(10) Patent No.: US 12,706,848 B2
(45) Date of Patent: Aug. 11, 2026

(54) FRAGMENTED PACKET TRAFFIC RATE LIMITING METHOD, DPU FRAGMENTED PACKET FORWARDING METHOD, AND ELECTRONIC DEVICE

(71) Applicant: YUSUR Technology Co., Ltd., Beijing (CN)

(72) Inventors: Xu Sun, Beijing (CN); Shaokun Wang, Beijing (CN)

(73) Assignee: YUSUR Technology Co., Ltd., Beijing (CN)

( * ) Notice: Subject to any disclaimer, the term of this patent is extended or adjusted under 35 U.S.C. 154(b) by 101 days.

(21) Appl. No.: 18/674,882

(22) Filed: May 26, 2024

(65) Prior Publication Data

US 2024/0314076 A1 Sep. 19, 2024

Related U.S. Application Data

(63) Continuation of application No. PCT/CN2023/127579, filed on Oct. 30, 2023.

(30) Foreign Application Priority Data

Oct. 28, 2022 (CN) ......................... 202211331788.5

(51) Int. Cl.
*H04L 47/215* (2022.01)
*H04L 47/32* (2022.01)

(52) U.S. Cl.
CPC ............ *H04L 47/215* (2013.01); *H04L 47/32* (2013.01)

(58) Field of Classification Search
CPC ... H04L 67/1097; H04L 69/16; H04L 69/166; H04L 67/02; H04L 69/22; H04L 1/0041;

(Continued)

(56) References Cited

U.S. PATENT DOCUMENTS 6,748,435 B1 * 6/2004 Wang ...................... H04L 47/29 370/235.1
2002/0089929 A1 * 7/2002 Tallegas .................. H04L 45/00 370/395.21

(Continued)

FOREIGN PATENT DOCUMENTS

CN 102932272 A 2/2013
CN 111064676 A 4/2020

(Continued)

OTHER PUBLICATIONS

PCT International search report of PCT/CN2023/127579 issued by CNIPA on Jan. 29, 2024.

(Continued)

*Primary Examiner* — Djenane M Bayard
(74) *Attorney, Agent, or Firm* — Bayramoglu Law Offices LLC

(57) ABSTRACT

This application provides a fragmented packet traffic rate limiting method, a DPU fragmented packet forwarding method, and an electronic device. The rate limiting method includes: pre-coloring a target fragmented packet based on a preset packet fragment coloring table such that the target fragmented packet is provided with a color mark, where the color mark includes a discarded color and a reserved color; performing traffic evaluation on the pre-colored target fragmented packet based on a color-aware token bucket algorithm to perform secondary coloring processing on the target fragmented packet, and updating the packet fragment coloring table based on the color mark of the target fragmented packet subjected to secondary coloring; and performing rate limiting processing on a target fragmented packet which is marked as the discarded color. This application effectively avoids forwarding of an invalid fragmented packet, (Continued)

improves fragmented packet forwarding efficiency, and reduces a waste of a network bandwidth resource.

17 Claims, 3 Drawing Sheets

(58) Field of Classification Search

CPC ....... H04L 47/34; H04L 69/163; H04L 69/12; H04L 47/10; H04L 1/0072; H04L 69/161; H04L 69/326; H04L 47/32; H04L 67/56; H04L 47/193; H04L 47/30; H04L 65/80; H04L 47/283; H04L 67/2876; H04L 47/27; H04L 1/0057; H04L 1/08; H04L 69/323; H04L 47/43; H04L 69/324; H04L 69/329; H04L 43/028; H04L 47/31; H04L 69/165; H04L 1/0083; H04L 1/1809; H04L 12/6418; H04L 47/263; H04L 67/34; H04L 69/18; H04L 1/0007; H04L 1/0075; H04L 1/1841; H04L 2001/0097; G06F 11/108; G06F 12/0246; G06F 2212/2022; G06F 2212/7205; G06F 9/52; G06F 3/0608; G06F 9/3004; G06F 1/183; G06F 12/0804; G06F 12/0868; G06F 12/12; G06F 12/121; G06F 12/123; G06F 13/28; G06F 13/4022; G06F 13/426; G06F 2211/002; G06F 2211/103; G06F 2212/1044; G06F 2212/222; G06F 2212/70; G06F 3/0604; G06F 3/0613; G06F 3/0619; G06F 3/0643; G06F 3/065; G06F 3/0652; G06F 3/0656; G06F 3/0659; G06F 3/0679; G06F 3/0685; G06F 3/0688; G06F 9/54

See application file for complete search history.

(56) References Cited

U.S. PATENT DOCUMENTS

2007/0153682 A1* 7/2007 Swenson ............ H04L 47/2441 370/235
2013/0336125 A1 12/2013 Wang et al.
2017/0041236 A1 2/2017 Agarwal
2017/0208009 A1* 7/2017 Agarwal ............... H04L 47/215
2017/0279730 A1* 9/2017 Calin .................. H04L 49/9005

FOREIGN PATENT DOCUMENTS

CN 112995059 A 6/2021
CN 113810308 A 12/2021
CN 114338554 A 4/2022
CN 114650258 A 6/2022
CN 115766591 A 3/2023
JP 2000349814 A 12/2000
JP 2008294535 A 12/2008
JP 2015144390 A 8/2015
JP 2017152778 A 8/2017
WO 2020078390 A1 4/2020
WO 2022127729 A1 6/2022

OTHER PUBLICATIONS

EESR of EPO family application No. EP23881998.1, European Patent Office, dated on Mar. 7, 2025, 4 pages.

Notice of Reasons for Refusal of JP family application No. JP2024-532904, Japan Patent Office, dated on Mar. 18, 2025, 6 pages, with English translation.

Decision to Grant a Patent of JP family application No. JP2024-532904, Japan Patent Office, dated on Jul. 1, 2025, 3 pages, with English translation.

* cited by examiner

FRAGMENTED PACKET TRAFFIC RATE LIMITING METHOD, DPU FRAGMENTED PACKET FORWARDING METHOD, AND ELECTRONIC DEVICE

CROSS REFERENCE TO RELATED APPLICATIONS

This application is a continuation of international application No. PCT/CN2023/127579, filed on Oct. 30, 2023, which claims priority to Chinese Patent Application No. 202211331788.5 titled "FRAGMENTED PACKET TRAFFIC RATE LIMITING METHOD, DPU FRAGMENTED PACKET FORWARDING METHOD, AND APPARATUS" and filed with the China National Intellectual Property Administration on Oct. 28, 2022, both of which are incorporated herein by reference in their entireties.

TECHNICAL FIELD

This application relates to the field of data processing technologies, and in particular, to a fragmented packet traffic rate limiting method, a DPU fragmented packet forwarding method, and an electronic device.

BACKGROUND

In a network transmission process, when an IP layer protocol implements transmission of data with a large quantity of bytes, because of a limitation of a maximum transmission unit MTU (MTU) at a data link layer, a transmit end needs to perform fragmentation processing on an upper-layer packet, to divide the packet into fragments whose length is not greater than a link maximum packet length, and then a data processing device such as a DPU performs traffic rate limiting on these fragments, and forwards fragments that meet a rate limiting rule to a receive end; and after receiving the fragments, the receive end reassembles fragments belonging to a same packet to restore an original data packet.

Currently, the data processing device such as the DPU mainly uses a token bucket algorithm to perform traffic rate limiting on the fragmented packets that need to be forwarded by the data processing device. When each fragmented packet arrives, traffic evaluation is performed on the fragmented packet by using a token bucket. If the traffic of the fragmented packet does not exceed committed traffic or a maximum allowable burst traffic range, corresponding color marking is performed on the fragmented packet, and subsequent forwarding is performed. Otherwise, a packet fragment that exceeds a specified rate is subsequently discarded by a module.

However, in a process of forwarding the fragmented packets, if a specific fragment in a fragment sequence of an IP packet is discarded in a forwarding process performed by the data processing device, the receive end cannot perform fragment reassembly and cannot restore original data of the IP packet. Therefore, invalid fragment forwarding occurs in the forwarding process performed by the data processing device, a large quantity of network bandwidth resources are wasted, and data processing efficiency and application reliability of the data processing device such as the DPU are also affected.

SUMMARY

In view of this, embodiments of this application provide a fragmented packet traffic rate limiting method, a DPU fragmented packet forwarding method, and an electronic device, to eliminate or improve one or more defects in the conventional technology.

A first aspect of this application provides a fragmented packet traffic rate limiting method, including:

- performing pre-coloring processing on a target fragmented packet based on a preset packet fragment coloring table such that the target fragmented packet is provided with a color mark, where the color mark includes: a discarded color and a reserved color;
- performing traffic evaluation on the pre-colored target fragmented packet based on a color-aware token bucket algorithm to perform secondary coloring processing on the target fragmented packet, and updating the packet fragment coloring table based on the color mark of the target fragmented packet subjected to secondary coloring; and
- when a current color mark of the target fragmented packet is the discarded color, performing rate limiting processing on the target fragmented packet, or when a current color mark of the target fragmented packet is the reserved color, performing forwarding processing on the target fragmented packet.

In some embodiments of this application, before the performing pre-coloring processing on a target fragmented packet based on a preset packet fragment coloring table, the method further includes:

- creating a packet fragment coloring table used to store a correspondence between an identifier of an original data packet to which a fragmented packet belongs and a color identifier, where
- the identifier of the original data packet includes a source IP, a destination IP, a protocol type, and a unique identification.

In some embodiments of this application, the performing pre-coloring processing on a target fragmented packet based on a preset packet fragment coloring table such that the target fragmented packet is provided with a color mark includes:

- obtaining an identifier of an original data packet to which a currently received target fragmented packet belongs; and
- searching the packet fragment coloring table to determine whether the identifier of the original data packet to which the target fragmented packet belongs is included, and when the identifier of the original data packet to which the target fragmented packet belongs is included, performing pre-coloring processing on the target fragmented packet based on a color mark corresponding to the identifier of the original data packet.

In some embodiments of this application, the fragmented packet traffic rate limiting method further includes:

- if the identifier of the original data packet to which the target fragmented packet belongs is not found in the packet fragment coloring table, using the reserved color as a default color to pre-color the target fragmented packet, and storing, in the packet fragment coloring table, a correspondence between the identifier of the original data packet to which the target fragmented packet belongs and a color mark that is the reserved color.

In some embodiments of this application, the performing traffic evaluation on the pre-colored target fragmented packet based on a color-aware token bucket algorithm to perform secondary coloring processing on the target fragmented packet, and updating the packet fragment coloring table based on the color mark of the target fragmented packet subjected to secondary coloring includes:

identifying the current color mark of the target fragmented packet based on the color-aware token bucket algorithm, and when it is identified that the color mark of the target fragmented packet is the discarded color, determining that a color mark for the secondary coloring of the target fragmented packet remains unchanged;

when the color mark of the target fragmented packet is the reserved color, determining whether a quantity of tokens in a corresponding token bucket meets a packet length of the target fragmented packet, and when the quantity of tokens in the corresponding token bucket meets the packet length of the target fragmented packet, determining that the color mark for the secondary coloring of the target fragmented packet remains unchanged, and reducing, in the token bucket, the quantity of tokens that meet the packet length of the target fragmented packet; or when it is determined that the quantity of tokens in the token bucket does not meet the packet length of the target fragmented packet, changing the color mark for the secondary coloring of the target fragmented packet to the discarded color, and updating, in the packet fragment coloring table, a color mark of the original data packet to which the target fragmented packet belongs.

In some embodiments of this application, before the performing forwarding processing on the target fragmented packet, the fragmented packet traffic rate limiting method further includes:

determining whether the target fragmented packet subjected to traffic evaluation is a last fragmented packet of the original data packet to which the target fragmented packet belongs; and when the target fragmented packet subjected to traffic evaluation is the last fragmented packet of the original data packet to which the target fragmented packet belongs, deleting a record of the original data packet to which the target fragmented packet belongs from the packet fragment coloring table.

A second aspect of this application provides a DPU fragmented packet forwarding method, including:

locally receiving a to-be-forwarded target fragmented packet at a DPU; and processing the received target fragmented packet according to the fragmented packet traffic rate limiting method provided in the first aspect, and performing forwarding processing on the target fragmented packet when the current color mark of the target fragmented packet is the reserved color.

In some embodiments of this application, the packet fragment coloring table is configured to store a correspondence between keyword information of an original data packet to which the fragmented packet belongs and a color identifier, where keyword information of the fragmented packet includes a unique identification and a local flow label, and the local flow label is preset based on the identifier of the original data packet.

Another aspect of this application provides a fragmented packet traffic rate limiting apparatus, including:

a pre-coloring module, configured to perform pre-coloring processing on a target fragmented packet based on a preset packet fragment coloring table such that the target fragmented packet is provided with a color mark, where the color mark includes: a discarded color and a reserved color;

a traffic evaluation module, configured to perform traffic evaluation on the pre-colored target fragmented packet based on a color-aware token bucket algorithm to perform secondary coloring processing on the target fragmented packet, and update the packet fragment coloring table based on the color mark of the target fragmented packet subjected to secondary coloring; and a fragment rate limiting module, configured to: if a current color mark of the target fragmented packet is the discarded color, perform rate limiting processing on the target fragmented packet, or if a current color mark of the target fragmented packet is the reserved color, perform forwarding processing on the target fragmented packet.

Another aspect of this application provides a DPU fragmented packet forwarding apparatus, including:

a fragment receiving module, configured to locally receive a to-be-forwarded target fragmented packet at a DPU;

a traffic rate limiting module, configured to process the received target fragmented packet according to the fragmented packet traffic rate limiting method provided in the first aspect; and a fragment forwarding module, configured to perform forwarding processing on the target fragmented packet when the current color mark of the target fragmented packet is the reserved color.

Another aspect of this application provides an electronic device, including a memory, a processor, and a computer program that is stored in the memory and runnable on the processor. The processor is configured to implement, when executing the computer program, the fragmented packet traffic rate limiting method provided in the first aspect is implemented, or the DPU fragmented packet forwarding method provided in the second aspect is implemented.

Another aspect of this application provides a computer-readable storage medium. The computer-readable storage medium stores a computer program. When the computer program is executed by a processor, the fragmented packet traffic rate limiting method provided in the first aspect is implemented, or the DPU fragmented packet forwarding method provided in the second aspect is implemented.

According to the fragmented packet traffic rate limiting method provided in this application, before traffic evaluation is performed on a fragmented packet by using a token bucket algorithm, pre-coloring processing is performed on a received fragmented packet, so that a fragmented packet that is pre-colored with a discarded color can be directly discarded in a traffic evaluation process, and evaluation using tokens in a token bucket is no longer performed on each fragmented packet, thereby effectively reducing resource consumption in the traffic evaluation process and improving traffic evaluation efficiency; traffic evaluation is performed on the pre-colored fragmented packet based on a color-aware token bucket algorithm to perform secondary coloring processing on the fragmented packet, to further discard, on a basis of improving traffic evaluation efficiency, a fragmented packet that is pre-stained with a reserved color but whose size exceeds that of a fragmented packet in a remaining field in the token bucket, and further ensure validity and reliability of fragmented packet traffic rate limiting; and before forwarding, rate limiting processing is performed on a fragmented packet whose color mark for pre-coloring and secondary coloring is the discarded color, to effectively avoid forwarding of an invalid fragmented packet, improve fragmented packet forwarding efficiency, and effectively reduce a waste of a network bandwidth resource, so that a receive end device can obtain original data packets through restoration of received fragmented packets, to further improve validity and reliability of fragmented packet forwarding.

Additional advantages, objectives, and features of this application will be described in part in the following description, and will become partially apparent to those of ordinary skill in the art after they study the following, or may be learned based on the practice of this application. The objectives and other advantages of this application may be realized and obtained by a structure specified in the specification and the accompanying drawings.

A person skilled in the art will understand that the objectives and advantages that can be achieved by using this application are not limited to the foregoing specific descriptions, and the foregoing and other objectives that can be achieved by this application will be more clearly understood according to the following detailed descriptions.

BRIEF DESCRIPTION OF THE DRAWINGS

The accompanying drawings described herein provide further understanding of this application, constitute a part of this application, and constitute no limitation on this application. Parts in the accompanying drawings are not drawn to scale, but are only used to illustrate principles of this application. For ease of illustrating and describing some parts of this application, corresponding parts in the accompanying drawings may be enlarged, that is, may become larger than other parts in an example apparatus actually manufactured according to this application.

DETAILED DESCRIPTION

Figure 1:
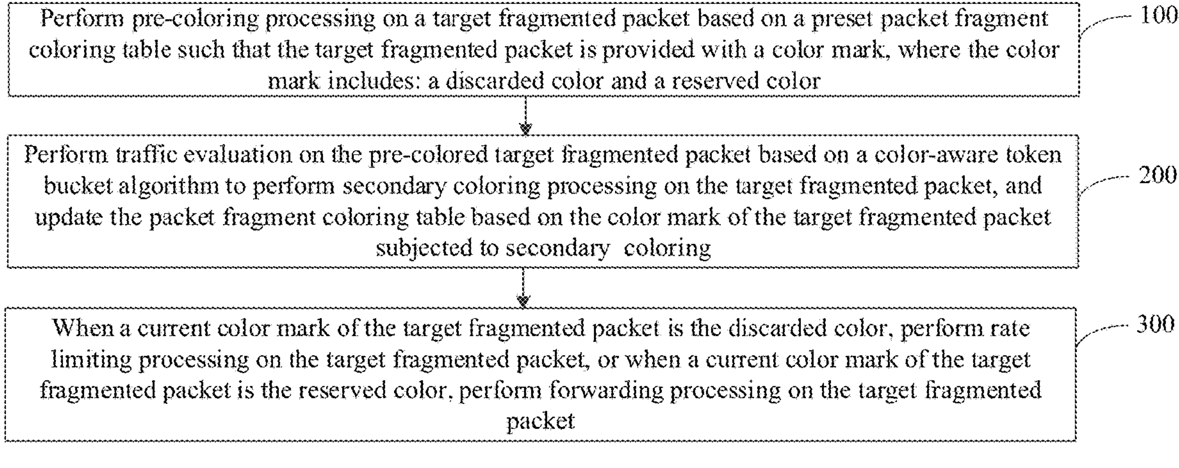
FIG. 1 is an overall schematic flowchart of a fragmented packet traffic rate limiting method according to an embodiment of this application.

To make the objectives, technical solutions, and advantages of this application clearer, the following further describes this application in detail with reference to implementations and the accompanying drawings. Herein, a schematic implementation of this application and descriptions thereof are used to explain this application, but are not intended to limit this application.

It should be further noted herein that, in order to avoid blurring this application due to unnecessary details, only structures and/or processing steps closely related to the solutions according to this application are shown in the accompanying drawings, and other details that have little relationship with this application are omitted.

It should be emphasized that the term “comprise/include” when used herein refers to the presence of a feature, an element, a step, or a component, but does not rule out the presence or addition of one or more other features, elements, steps, or components.

It should be further noted herein that unless otherwise specified, the term “connection” in this specification may refer to not only a direct connection, but also an indirect connection in which an intermediate object exists.

The following describes the embodiments of this application with reference to the accompanying drawings. In the accompanying drawings, same reference numerals represent same or similar components, or same or similar steps.

For the problems that in a case in which forwarding of an invalid fragment occurs in a forwarding process performed by an existing data processing device, a large quantity of network bandwidth resources are wasted, data processing efficiency and application reliability of a data processing device such as a DPU are also affected, and the like, in this application, it is first considered that: If a fragment in a fragment sequence is discarded, traffic evaluation and forwarding do not need to be performed on subsequent fragments, or otherwise, these subsequent fragments may also consume a remaining token in a token bucket when passing through the token bucket, preempting opportunities for other packets to obtain tokens and thus wasting a large quantity of network bandwidth resources.

When performing a fragmented packet rate limiting study, the inventors found that a reason for the foregoing defects in the conventional technology is that the token bucket has only a capability of performing traffic evaluation but does not have a capability of identifying which subsequent fragmented packets do not need to be forwarded. When optimizing a fragmented packet traffic evaluation result, the inventors found that a packet fragment coloring table may be introduced, each fragment is pre-colored first before a fragmented packet passes through the token bucket, and then a color-aware token bucket algorithm is used to perform traffic evaluation based on a pre-coloring result, so that it is possible to accurately identify which subsequent fragmented packets should be colored red and then are discarded in subsequent processing.

If a fragment flow is transmitted to a matched sub-token bucket for dedicated processing, that is, all fragments of a same packet are required to be processed simultaneously in separate buckets, this method exhibits poor availability. First, processing of each fragment is generally sequential, except that an extra buffer buffers the fragment. In addition, sizes of many original packets in each flow are different, and quantities of fragments of the original packets are also different. Performing calculations on a per-bucket basis consumes a large amount of calculation resources, which is not compatible with an actual packet processing scenario.

The fragmented packet traffic rate limiting method provided in this application is compatible with an actual packet processing scenario and adaptable to sequential processing within a same flow, at least for sequential processing of fragments from a same packet (not mandatory), and it does not require buffering of packets and imposes no consistency requirement on the quantity of packet fragments.

Specifically, the following embodiments are used for detailed description.

Based on this, an embodiment of this application provides a fragmented packet traffic rate limiting method that may be performed by a fragmented packet traffic rate limiting apparatus. As shown in FIG. 1, the fragmented packet traffic rate limiting method specifically includes the following content:

Step 100: Perform pre-coloring processing on a target fragmented packet based on a preset packet fragment coloring table such that the target fragmented packet is provided with a color mark, where the color mark includes: a discarded color and a reserved color.

In step 100, a data processing device configured to perform the fragmented packet traffic rate limiting method may first receive fragmented packets from different transmit end devices, and determine a currently processed fragmented packet as a target packet, where these fragmented packets each carry at least an identifier of an original data packet to which the fragmented packet belongs, a unique identifier of the fragmented packet, and a unique identifier of a receive end device. For example, a source IP, a destination IP, a protocol type, and an identification may be included.

It may be understood that the packet fragment coloring table is a data table configured to store a correspondence between an identifier of each original data packet and a color mark. For example, when a fragmented packet A113 is received, an identifier A100 of an original data packet to which the fragmented packet A113 belongs may be first obtained, and the packet fragment coloring table is searched based on A100 to determine whether a color mark corresponding to the original data packet is included. If a color mark belonging to the original data packet is found in the packet fragment coloring table based on A100, the fragmented packet A113 is pre-colored with a same color mark based on the color mark. The packet fragment coloring table is specifically described in detail by using subsequent embodiments.

In one or more embodiments of this application, the color mark may include at least a discarded color and a reserved color. The two colors may be selected according to an actual application requirement, and only a color difference between the two colors needs to be ensured. In a preferred example, the discarded color may be defined as red, and the reserved color may be defined as green, to be better compatible with an application habit of a token bucket algorithm, thereby improving application reliability and efficiency of the fragmented packet traffic rate limiting method.

In another example, the color mark may alternatively include three or more color marks, such as green, yellow, and red, for use in a three-color token bucket or the like.

Step 200: Perform traffic evaluation on the pre-colored target fragmented packet based on a color-aware token bucket algorithm to perform secondary coloring processing on the target fragmented packet, and update the packet fragment coloring table based on the color mark of the target fragmented packet subjected to secondary coloring.

In step 200, a token bucket may be considered as a container for storing tokens, and a specific capacity is preset. A system places tokens into the bucket at a given speed. When the bucket is full with tokens, excess tokens overflow. The color-aware (Color-Aware, also referred to as a "color-sensitive mode") token bucket algorithm refers to:

(1) A pre-coloring color mark for the fragmented packet is first identified, and if the pre-coloring color mark is the discarded color, the fragmented packet is directly discarded, and it is determined that a color mark for secondary coloring of the fragmented packet remains unchanged.

(2) If the pre-coloring color mark for the fragmented packet is the reserved color, whether the token bucket includes sufficient tokens equivalent to a size of the fragmented packet is first determined based on the size of the fragmented packet.

If the token bucket includes sufficient tokens equivalent to the size of the fragmented packet, an amount of tokens equivalent to a data size are taken out and used to transmit data, and it is determined that the color mark for the secondary coloring of the fragmented packet remains unchanged.

If the token bucket does not include sufficient tokens equivalent to the size of the fragmented packet, the fragmented packet is discarded, and the color mark for the secondary coloring of the fragmented packet is changed from the reserved color to the discarded color. In this way, packet traffic can be limited to a speed that is less than or equal to a token generation speed, to achieve a purpose of limiting traffic.

Step 300: If a current color mark of the target fragmented packet is the discarded color, perform rate limiting processing on the target fragmented packet, or if a current color mark of the target fragmented packet is the reserved color, perform forwarding processing on the target fragmented packet.

In step 300, a manner of performing the rate limiting processing on the fragmented packet whose color mark is the discarded color may be set according to an actual application requirement. For example, the fragmented packet whose color mark is the discarded color may be directly discarded (deleted), so that all remaining fragmented packets are used for subsequent forwarding. Alternatively, the fragmented packet whose color mark is the discarded color may be stored in a non-forwarding group, and then other fragmented packets that are not stored in this group are forwarded. In this way, a user can subsequently search the non-forwarding group for the fragmented packet that is not forwarded to perform processing such as re-lowered priority forwarding on the fragmented packet.

It can be learned from the foregoing descriptions that, according to the fragmented packet traffic rate limiting method provided in this application, before traffic evaluation is performed on a fragmented packet by using a token bucket algorithm, pre-coloring processing is performed on a received fragmented packet, so that a fragmented packet that is pre-colored with a discarded color can be directly discarded in a traffic evaluation process, and evaluation using tokens in a token bucket is no longer performed on each fragmented packet, thereby effectively reducing resource consumption in the traffic evaluation process and improving traffic evaluation efficiency; traffic evaluation is performed on the pre-colored fragmented packet based on a color-aware token bucket algorithm to perform secondary coloring processing on the fragmented packet, to further discard, on a basis of improving traffic evaluation efficiency, a fragmented packet that is pre-stained with a reserved color but whose size exceeds that of a fragmented packet in a remaining field in the token bucket, and further ensure validity and reliability of fragmented packet traffic rate limiting; and before forwarding, rate limiting processing is performed on a fragmented packet whose color mark for pre-coloring and secondary coloring is the discarded color, to effectively avoid forwarding of an invalid fragmented packet, improve fragmented packet forwarding efficiency, and effectively reduce a waste of a network bandwidth resource, so that a receive end device can obtain original data packets through restoration of received fragmented packets, to further improve validity and reliability of fragmented packet forwarding.

Figure 2:
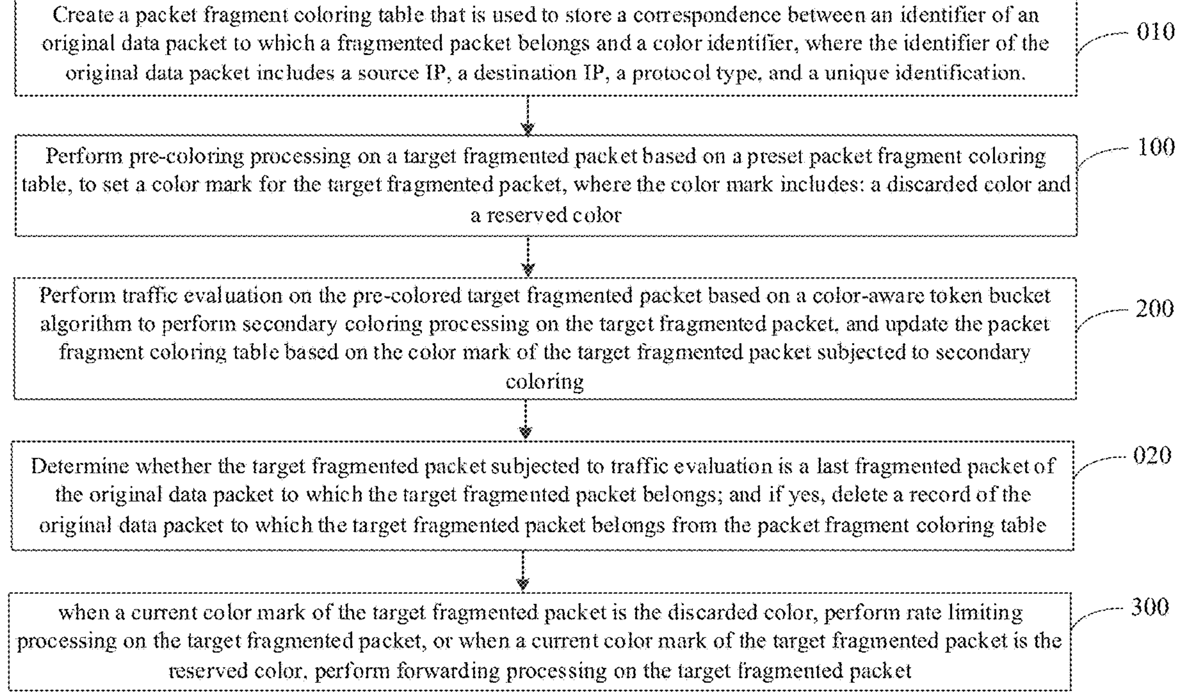
FIG. 2 is a specific schematic flowchart of a fragmented packet traffic rate limiting method according to an embodiment of this application.

To further improve application reliability and validity of the packet fragment coloring table, in the fragmented packet traffic rate limiting method provided in this embodiment of this application, as shown FIG. 2, before step 100 in the fragmented packet traffic rate limiting method, the method further specifically includes the following content:

Step 010: Create a packet fragment coloring table that is used to store a correspondence between an identifier of an original data packet to which a fragmented packet belongs and a color identifier, where the identifier of the original data packet includes a source IP, a destination IP, a protocol type, and a unique identification (that is, Identification).

In a specific example, that the identifier of the original data packet to which the fragmented packet belongs includes the source IP, the protocol type, the destination IP (a unique identifier of the receive end device), and the Identification is used as an example. Refer to an example of a structure of the packet fragment coloring table shown in Table 1.

TABLE 1

| Identifier of the original data packet (KEY) | | | | |
|---|---|---|---|---|
| Source IP | Destination IP | Protocol type | Unique identification (Identification) | Value (VALUE) colored |
| 10.10.10.8 | 192.168.14.4 | TCP | 0x4ae1 | Green |
| 10.10.10.7 | 192.168.14.4 | TCP | 0x2bc3 | Red |
| 10.10.8.2 | 192.168.16.3 | UDP | 0xd465 | Green |

To further improve application reliability and validity of pre-coloring processing, in the fragmented packet traffic rate limiting method provided in this embodiment of this application, step 100 in the fragmented packet traffic rate limiting method specifically includes the following content:

Step 110: Obtain an identifier of an original data packet to which a currently received target fragmented packet belongs.

Step 120: Search the packet fragment coloring table to determine whether the identifier of the original data packet to which the target fragmented packet belongs is included, and if the identifier of the original data packet to which the target fragmented packet belongs is included, perform pre-coloring processing on the target fragmented packet based on a color mark corresponding to the identifier of the original data packet.

It may be understood that, actually, a process of pre-coloring a fragment by using the packet fragment coloring table is to associate each fragment that belongs to a same original IP packet with a color of the most recent fragment that has passed through the token bucket and that is in the fragment sequence. Further, a traffic evaluation result of a color-aware token bucket is optimized.

To further improve application reliability and validity of pre-coloring processing, in the fragmented packet traffic rate limiting method provided in this embodiment of this application, step 120 in the fragmented packet traffic rate limiting method further specifically includes the following content:

Step 121: If the identifier of the original data packet to which the target fragmented packet belongs is not found in the packet fragment coloring table, use the reserved color as a default color to pre-color the target fragmented packet, and store, in the packet fragment coloring table, a correspondence between the identifier of the original data packet to which the target fragmented packet belongs and a color mark that is the reserved color.

For example, if a first fragment of an IP packet is received (if an unordered sequence occurs, the fragment may not be the first fragment), packet information (the foregoing KEY value) is extracted to query the packet fragment coloring table, and a corresponding entry is not found, a new entry record is added, and a color value is green by default. Subsequently, when traffic rate limiting is performed on the fragmented packet, an evaluation is performed based on the color-aware token bucket algorithm (a plurality of types of classical token bucket algorithms are optional). If an evaluation result is green, there is no need to modify a fragment information table, and the packet is processed based on a behavior (sending by default) corresponding to green. If the evaluation result is red, a coloring value corresponding to the fragment information table is modified to red, and the packet is processed based on a behavior (discarding by default) corresponding to red. When a subsequent fragment of the IP packet is received, the packet fragment coloring table is also queried, and a corresponding entry is found. If a coloring value of a previous first segment is set to red, the packet is directly pre-colored to red. Subsequently, when traffic rate limiting is performed on the fragmented packet, the packet is directly processed (discarded by default) to red based on the color-aware token bucket algorithm.

To further improve application reliability and validity of a traffic evaluation process, in the fragmented packet traffic rate limiting method provided in this embodiment of this application, step 200 in the fragmented packet traffic rate limiting method further specifically includes the following content:

Step 210: First identify the current color mark of the target fragmented packet based on the color-aware token bucket algorithm, and if it is identified that the color mark of the target fragmented packet is the discarded color, determine that a color mark for the secondary coloring of the target fragmented packet remains unchanged.

Step 220: If the color mark of the target fragmented packet is the reserved color, determine whether a quantity of tokens in a corresponding token bucket meets a packet length of the target fragmented packet, and if the quantity of tokens in the corresponding token bucket meets the packet length of the target fragmented packet, determine that the color mark for the secondary coloring of the target fragmented packet remains unchanged, and reduce, in the token bucket, the quantity of tokens that meet the packet length of the target fragmented packet.

Step 230: If it is determined that the quantity of tokens in the token bucket does not meet the packet length of the target fragmented packet, change the color mark for the secondary coloring of the target fragmented packet to the discarded color, and update, in the packet fragment coloring table, a color mark of the original data packet to which the target fragmented packet belongs.

For example:

A single-speed single-bucket token bucket is used as an example to briefly describe content of the color-aware token bucket algorithm.

The algorithm follows the following rules when the algorithm is used to perform traffic evaluation on an incoming packet:

if the packet has been colored green but the packet length (assumed to be B) does not exceed a remaining token quantity (assumed to be Tc) in the token bucket, the packet is colored green and Tc=Tc−B;

if the packet has been colored green and the packet length exceeds the remaining token quantity Tc in the token bucket, the packet is colored red, and Tc remains unchanged; and if the packet has been colored red, the packet remains red, and Tc remains unchanged.

In this method, when traffic evaluation is performed on the fragmented packet by using the color-aware token bucket algorithm, a fragmented packet pre-coloring result in the foregoing key point 1 is used.

The token bucket algorithm is still used to perform traffic evaluation on colored subsequent fragments to prevent an excessive packet (having a large quantity of fragments) or a malicious fragment attack from causing excessive traffic bursts, resulting in ineffective actual rate limiting, and finally resulting in uncontrolled bandwidth preemption and packet losses. That is, on the basis of avoiding sending invalid fragments as far as possible, a rate limiting effect can be considered, to avoid a malicious burst (full green sending).

For various classical token bucket algorithms, the last output is colors of packets, which are generally three colors: green (with sufficient tokens), yellow (an intermediate case, which is determined differently in different algorithms, for example, there a bucket C has no token and a bucket E has a token, or a bucket P has a token and the C bucket has no token), and red (with insufficient tokens). A partially simplified token bucket algorithm (single-speed dual-color) has only green and red. Different coloring results correspond to different packet processing manners (user configurations). Generally, green pass and red drop are used by default. Therefore, a token bucket algorithm is described in this embodiment of this application, the token bucket algorithm is mostly described in terms of coloring.

To further improve the application reliability and validity of the traffic evaluation process, in the fragmented packet traffic rate limiting method provided in this embodiment of this application, as shown in FIG. 2, between step 200 and step 300 in the fragmented packet traffic rate limiting method, the method further specifically includes the following content:

Step 020: Determine whether the target fragmented packet subjected to traffic evaluation is a last fragmented packet of the original data packet to which the target fragmented packet belongs; and if the target fragmented packet subjected to traffic evaluation is the last fragmented packet of the original data packet to which the target fragmented packet belongs, delete a record of the original data packet to which the target fragmented packet belongs from the packet fragment coloring table.

A DPU (Data Processing Unit) is a special-purpose processor constructed based on data, and uses a software-defined technical route to support resource virtualization at an infrastructure layer, and support infrastructure layer services such as storage, security, and quality of service management. The DPU can provide core components for a data center, 5G edge computing, cloud computing, and the like. In a process of performing data forwarding by the DPU, when an IP layer protocol implements transmission of data with a large quantity of bytes, because of a limitation of a maximum transmission unit MTU (Maximum Transmission Unit) at a data link layer, a transmit end needs to perform fragmentation processing on an upper-layer original data packet, to divide the packet into fragments whose length is not greater than a link maximum packet length, then the obtained fragments are sent to the DPU, and the DPU performs traffic rate limiting on fragments to be forwarded by the DPU and forwards fragments that meet a rate limiting rule to a receive end; and after receiving the fragments, the receive end reassembles fragments belonging to a same packet to restore an original data packet.

Currently, the DPU mainly uses a token bucket algorithm to perform traffic rate limiting on the fragmented packets to be forwarded by the PDU. When each fragment arrives, traffic evaluation is performed on the fragment by using a token bucket. If the traffic of the fragment does not exceed committed traffic or a maximum allowable burst traffic range, corresponding color marking is performed on the fragment, and subsequent forwarding is performed. Otherwise, a fragment that exceeds a specified rate is subsequently discarded by a module.

However, a current policy of forwarding a fragmented packet by the DPU is obviously defective. In a process of forwarding fragmented packets, if a specific fragment in a fragment sequence of an IP packet is discarded in a forwarding process performed by the DPU, the receive end cannot perform fragment reassembly and cannot restore original data of the IP packet. Therefore, invalid traffic rate limiting evaluation and invalid fragment forwarding occur in the forwarding process performed by the DPU, a large quantity of network bandwidth resources are wasted, and data processing efficiency and application reliability of the DPU are also affected.

Figure 3:
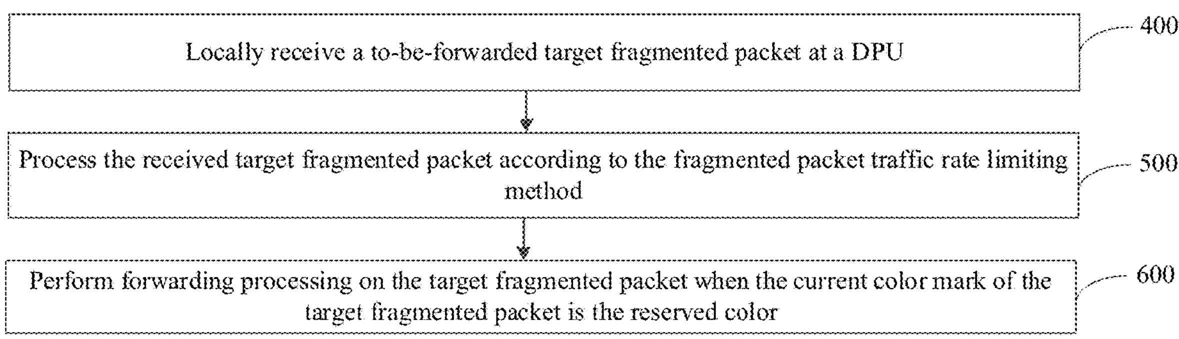
FIG. 3 is a schematic flowchart of a DPU fragmented packet forwarding method according to another embodiment of this application.

Based on this, this application further provides an embodiment of a DPU fragmented packet forwarding method based on the foregoing embodiment of the fragmented packet traffic rate limiting method. As shown in FIG. 3, the DPU fragmented packet forwarding method specifically includes the following content:

Step 400: Locally receive a to-be-forwarded target fragmented packet at a DPU.

Step 500: Process the received target fragmented packet according to the fragmented packet traffic rate limiting method.

Specifically, for execution content of the fragmented packet traffic rate limiting method in step 500, refer to the foregoing embodiment of the fragmented packet traffic rate limiting method. Details are not described herein again.

Step 600: Perform forwarding processing on the target fragmented packet if the current color mark of the target fragmented packet is the reserved color.

To further improve efficiency and validity of a DPU fragmented packet forwarding process, in the DPU fragmented packet forwarding method provided in this embodiment of this application, the packet fragment coloring table in the DPU fragmented packet forwarding method is used to store a correspondence between keyword information of the original data packet to which the fragmented packet belongs and a color identifier.

Keyword information of the fragmented packet includes a unique identification and a local flow label, and the local flow label is preset based on the identifier of the original data packet.

Specifically, in a scenario of a DPU, some IP packet fragments are offloaded to the DPU. To facilitate identification of flow information, a flow label (2 bytes are generally used as local metadata (metadata) of the packet) may be set for each flow (generally a five-tuple, including a source IP, a destination IP, a protocol type, a source port, and a destination port). It is ensured that the flow label is unique in the device at a same moment. In this scenario, a fragment coloring table structure of the DPU may be optimized and adjusted. Only a flow label and an identification (Identification) field are used as KEY, for use in accelerated identification of rate limiting of a local fragment. Using the flow label is more convenient than the previous general method of extracting a three-tuple (a source IP, a destination IP, and a protocol type) information of the packet, so that performance is improved and space occupied by a table is reduced.

Figure 4:
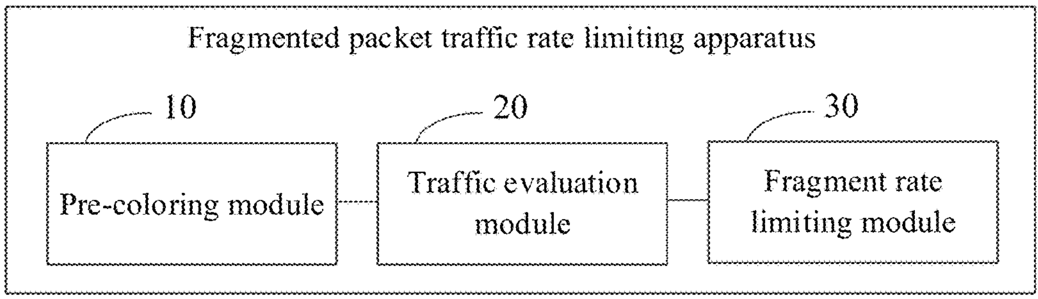
FIG. 4 is a schematic diagram of a structure of a fragmented packet traffic rate limiting apparatus according to another embodiment of this application.

From a software perspective, this application further provides a fragmented packet traffic rate limiting apparatus configured to execute all or a part of the content of the fragmented packet traffic rate limiting method. As shown in FIG. 4, the fragmented packet traffic rate limiting apparatus specifically includes the following content:

- a pre-coloring module 10, configured to perform pre-coloring processing on a target fragmented packet based on a preset packet fragment coloring table, to set a color mark for the target fragmented packet, where the color mark includes: a discarded color and a reserved color;
- a traffic evaluation module 20, configured to perform traffic evaluation on the pre-colored target fragmented packet based on a color-aware token bucket algorithm to perform secondary coloring processing on the target fragmented packet, and update the packet fragment coloring table based on the color mark of the target fragmented packet subjected to secondary coloring; and
- a fragment rate limiting module 30, configured to: if a current color mark of the target fragmented packet is the discarded color, perform rate limiting processing on the target fragmented packet, or if a current color mark of the target fragmented packet is the reserved color, perform forwarding processing on the target fragmented packet.

The embodiment of the fragmented packet traffic rate limiting apparatus provided in this application may be specifically configured to execute the processing procedure of the embodiment of the fragmented packet traffic rate limiting method in the foregoing embodiment. For a function of the fragmented packet traffic rate limiting apparatus, references may be made to the detailed description of the embodiment of the fragmented packet traffic rate limiting method.

The fragmented packet traffic rate limiting apparatus may perform fragmented packet traffic rate limiting in a server, for example, an edge server, but in another actual application case, all operations may be completed in a client device. Specifically, selection may be performed based on a processing capability of the client device, a limitation of a user usage scenario, and the like. This application sets no limitation thereto. If all the operations are completed in the client device, the client device may further include a processor, configured to perform specific processing of fragmented packet traffic rate limiting.

The foregoing client device may have a communication module (that is, a communication unit) and may be communicatively connected to a remote server, to implement data transmission with the server. The server may include a server on a side of a task scheduling center, and another implementation scenario may also include a server of an intermediate platform, for example, a server of a third-party server platform that has a communication link with the task scheduling center server. The server may include a single computer device, or may include a server cluster including a plurality of servers, or a server structure of a distributed apparatus.

The foregoing server may communicate with the client device by using any suitable network protocol, including a network protocol not yet developed at the filing date of this application. The network protocol may include, for example, a TCP/IP protocol, a UDP/IP protocol, an HTTP protocol, an HTTPS protocol, or the like. Certainly, the network protocol may further include, for example, an RPC protocol (Remote Procedure Call Protocol, remote procedure call protocol), a REST protocol (Representational State Transfer, representational state transfer), or the like that is used on the foregoing protocol.

It can be learned from the foregoing descriptions that, according to the fragmented packet traffic rate limiting apparatus provided in this application, before traffic evaluation is performed on a fragmented packet by using a token bucket algorithm, pre-coloring processing is performed on a received fragmented packet, so that a fragmented packet that is pre-colored with a discarded color can be directly discarded in a traffic evaluation process, and evaluation using tokens in a token bucket is no longer performed on each fragmented packet, thereby effectively reducing resource consumption in the traffic evaluation process and improving traffic evaluation efficiency; traffic evaluation is performed on the pre-colored fragmented packet based on a color-aware token bucket algorithm to perform secondary coloring processing on the fragmented packet, to further discard, on a basis of improving traffic evaluation efficiency, a fragmented packet that is pre-stained with a reserved color but whose size exceeds that of a fragmented packet in a remaining field in the token bucket, and further ensure validity and reliability of fragmented packet traffic rate limiting; and before forwarding, rate limiting processing is performed on a fragmented packet whose color mark for pre-coloring and secondary coloring is the discarded color, to effectively avoid forwarding of an invalid fragmented packet, improve fragmented packet forwarding efficiency, and effectively reduce a waste of a network bandwidth resource, so that a receive end device can obtain original data packets through restoration of received fragmented packets, to further improve validity and reliability of fragmented packet forwarding.

Figure 5:
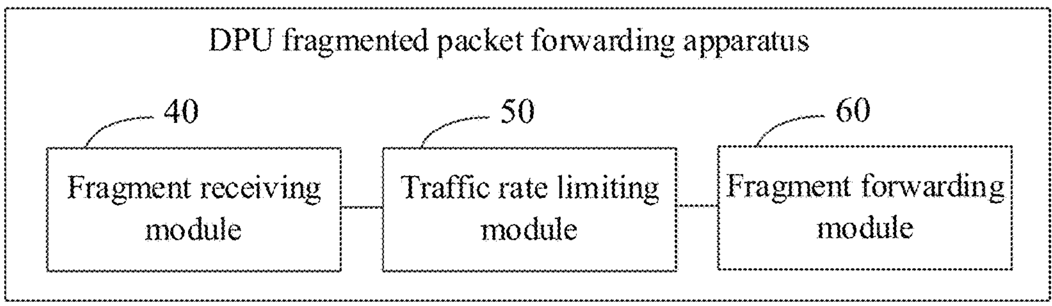
FIG. 5 is a schematic diagram of a structure of a DPU fragmented packet forwarding apparatus according to another embodiment of this application.

Based on at least one of the embodiment of the foregoing fragmented packet traffic rate limiting method and the embodiment of the DPU fragmented packet forwarding method, this application further provides a DPU fragmented packet forwarding apparatus configured to implement the DPU fragmented packet forwarding method. As shown in FIG. 5, the DPU fragmented packet forwarding apparatus specifically includes the following content:

- a fragment receiving module 40, configured to locally receive a to-be-forwarded target fragmented packet at a DPU;
- a traffic rate limiting module 50, configured to perform forwarding processing on the target fragmented packet if the current color mark of the target fragmented packet is the reserved color;
- specifically, for execution content of the fragmented packet traffic rate limiting method in the traffic rate limiting module 50, refer to the foregoing embodiment of the fragmented packet traffic rate limiting method. Details are not described herein again; and
- a fragment forwarding module 60, configured to forward a fragmented packet whose color mark after traffic evaluation is the reserved color.

Specifically, the DPU fragmented packet forwarding apparatus may be implemented in the DPU as a function module.

To further describe this solution, this application further provides a specific application instance of a fragmented packet traffic rate limiting method applied to a DPU, to resolve a problem that an invalid bandwidth loss exists when traffic rate limiting is performed on a fragmented packet on the DPU. The application instance of the fragmented packet traffic rate limiting method applied to the DPU specifically includes the following improvement content.

(I) Introduce a packet fragment coloring table to pre-color a fragmented packet.

The packet fragment coloring table is an index table. Fragment sequences of a same original IP packet correspond to an entry record in the index table. In the entry, information carried in an IP header is used as KEY (for example, a source IP, a destination IP, a protocol type, or an Identification field in the IP header is used as KEY), and a color of a last fragment that passes through a token bucket is used as Value. The first segment of a packet corresponds to a scenario in which an entry cannot be queried as described later, an entry is created, and a default color is green.

Before the fragmented packet passes through the token bucket, the information carried in the IP header of the packet is used as KEY. coloring information of a corresponding entry of the fragment is queried in the coloring table. If the coloring information (a header of the packet fragment) is not found, a new entry record is created, in the table, for the fragment sequence to which the packet belongs, and a default color is green. If the coloring information is found, a query result is used for pre-coloring of the fragmented packet.

Therefore, actually, a process of pre-coloring a fragment by using the fragment coloring table is to associate each fragment that belongs to a same original IP packet with a color of the most recent fragment that has passed through the token bucket and that is in the fragment sequence. Further, a traffic evaluation result of a color-aware token bucket is optimized.

(II) Based on a pre-coloring result, traffic rate limiting is performed in combination with the color-aware token bucket algorithm.

A color-aware mode refers to performing traffic evaluation based on a previous coloring result when a current packet or fragment passes through the token bucket.

To describe effects of the method, a single-speed single-bucket token bucket is used as an example herein to briefly describe content of the color-aware token bucket algorithm.

The algorithm follows the following rules when the algorithm is used to perform traffic evaluation on an incoming packet:

1. If the packet has been colored green but the packet length (assumed to be B) does not exceed a remaining token quantity (assumed to be Tc) in the token bucket, the packet is colored green and Tc=Tc−B.
2. If the packet has been colored green and the packet length exceeds the remaining token quantity Tc in the token bucket, the packet is colored red, and Tc remains unchanged.
3. If the packet has been colored red, the packet remains red, and Tc remains unchanged.

In this method, when traffic evaluation is performed on the packet fragment by using the color-aware token bucket algorithm, a fragmented packet pre-coloring result in the foregoing key point 1 is used.

The token bucket algorithm is still used to perform traffic evaluation on colored subsequent fragments to prevent an excessive packet (having a large quantity of fragments) or a malicious fragment attack from causing excessive traffic bursts, resulting in ineffective actual rate limiting, and finally resulting in uncontrolled bandwidth preemption and packet losses.

Therefore, traffic evaluation is performed with reference to the fragmented packet pre-coloring result, so that it can be ensured that as long as one fragment in fragments of the IP packet is colored red when passing through the bucket, a subsequently arriving fragment in the fragment sequence is also colored red. Conventionally, in subsequent processing, packets colored green are usually forwarded, and packets colored red are discarded. In this way, a loss caused by bandwidth occupied by an invalid fragment is avoided.

Figure 6:
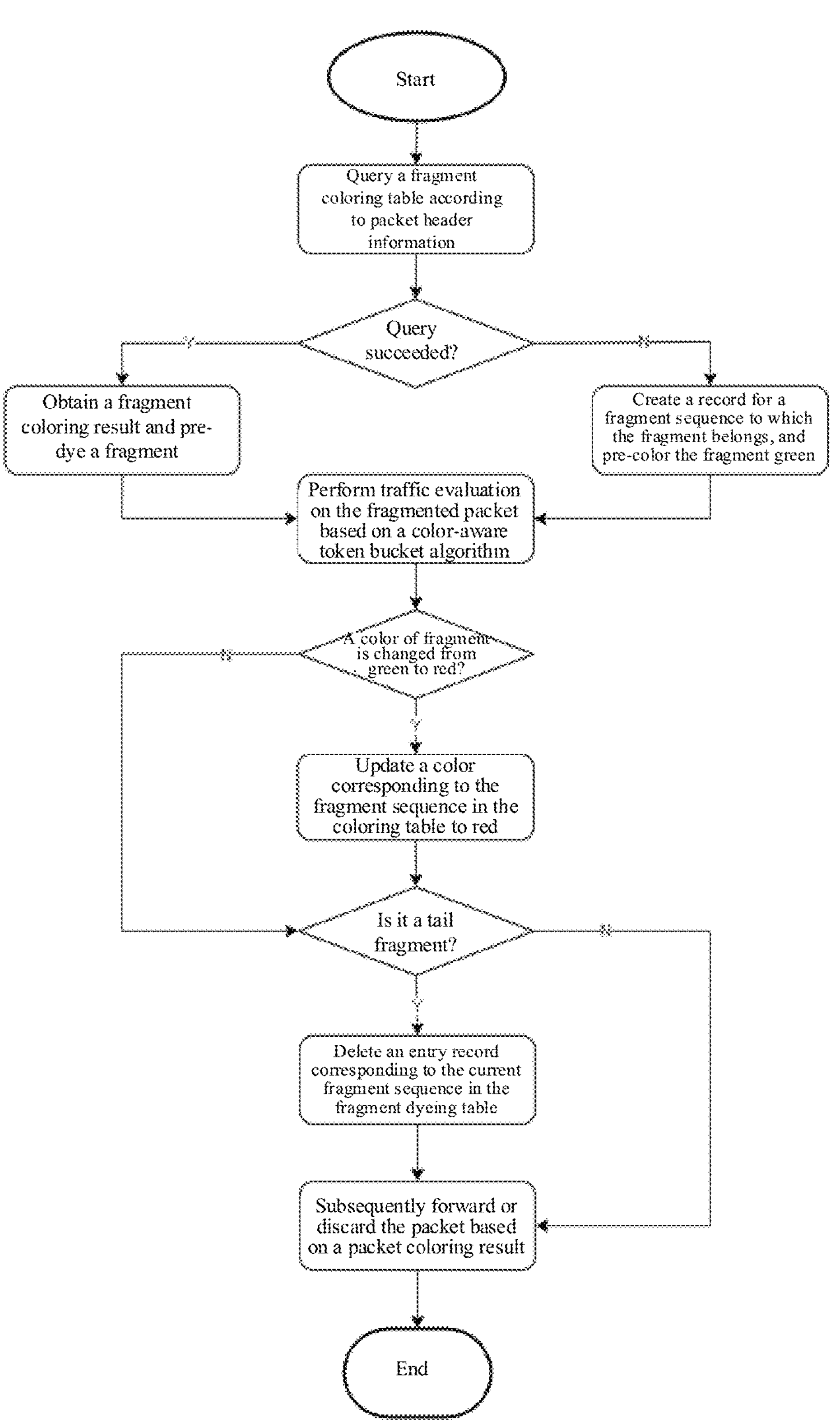
FIG. 6 is an example schematic flowchart of a method for performing traffic rate limiting on a fragmented packet by a DPU according to an application instance of this application.

Refer to FIG. 6. A color-aware single-speed single-bucket token bucket is used as an example to describe the method, and a procedure of the method for performing traffic rate limiting on a fragmented packet by a DPU is as follows.

1. Start to perform traffic rate limiting on a fragmented packet in incoming traffic, and query a coloring table based on that a source IP, a destination IP, a protocol type, or an Identification field in an IP packet header is used as KEY.

1.1. If the query succeeds, pre-color a fragment according to coloring information.

1.2. If the query fails, use the source IP, the destination IP, the protocol type, or the Identification field of the IP header as KEY in the fragment coloring table, to create an entry record for a fragment sequence to which the packet belongs, and pre-color the fragment green.

2. Based on the pre-coloring of the fragmented packet, perform traffic evaluation on the fragmented packet by using the color-aware token bucket algorithm.
3. If the fragmented packet changes from green to red after passing through the bucket, update a coloring color corresponding to the fragment sequence in the coloring table to red.
4. If the current fragmented packet is a tail fragment, delete an entry record corresponding to the current fragment sequence in the fragment coloring table.
5. Subsequently forward or discard the packet based on a packet coloring result.

In conclusion, the method provided in the application instance of this application can ensure that when the DPU performs traffic evaluation on each fragment of a received same IP packet, after a fragment that is first colored red appears, all subsequent fragments are colored red and then discarded in the traffic evaluation, thereby avoiding a bandwidth loss caused by forwarding invalid fragments in a network.

An embodiment of this application further provides an electronic device. For example, the electronic device may include a processor, a memory, a receiver, and a transmitter. The processor is configured to perform the fragmented packet traffic rate limiting method or the DPU fragmented packet forwarding method mentioned in the foregoing embodiments. The processor and the memory may be connected by using a bus or in another manner, and are connected by using a bus as an example. The receiver may be connected to the processor and the memory in a wired or wireless manner. The electronic device may receive real-time motion data from a sensor in a wireless media sensor network and receive an original video sequence from a video collection apparatus.

The processor may be a DPU. The processor may alternatively be another chip such as a general-purpose processor, a digital signal processor (Digital Signal Processor, DSP), an application specific integrated circuit (Application Specific Integrated Circuit, ASIC), a field-programmable gate array (Field-Programmable Gate Array, FPGA), another programmable logic device, a discrete gate or transistor logic device, or a discrete hardware component, or a combination of the foregoing types of chips.

As a non-transient computer-readable storage medium, the memory may be configured to store a non-transient software program, a non-transient computer-executable program, and a module, for example, a program instruction/module corresponding to the fragmented packet traffic rate limiting method or the DPU fragmented packet forwarding method in the embodiments of this application. The processor runs the non-transient software program, the instruction, and the module that are stored in the memory, to execute various functional applications and data processing of the processor, that is, implement the fragmented packet traffic rate limiting method or the DPU fragmented packet forwarding method in the foregoing method embodiments.

The memory may include a program storage area and a data storage area. The program storage area may store an operating system and an application required by at least one function; and the data storage area may store data created by the processor, and the like. In addition, the memory may include a high-speed random access memory, and may further include a non-transient memory, such as at least one magnetic disk storage device, a flash memory device, or another non-transient solid-state storage device. In some embodiments, the memory may optionally include memories remotely disposed relative to the processor, and theses remote memories may be connected to the processor over a network. Instances of the foregoing network include but are not limited to the Internet, an intranet, a local area network, a mobile communication network, and a combination thereof.

The one or more modules are stored in the memory. When the one or more modules are executed by the processor, the fragmented packet traffic rate limiting method or the DPU fragmented packet forwarding method in the embodiments is performed.

In some embodiments of this application, user equipment may include a processor, a memory, and a transceiver unit. The transceiver unit may include a receiver and a transmitter. The processor, the memory, the receiver, and the transmitter may be connected through a bus system. The memory is configured to store computer instructions. The processor is configured to execute the computer instructions stored in the memory, to control the transceiver unit to send and receive signals.

In an implementation, functions of the receiver and the transmitter in this application may be implemented by using a transceiver circuit or a transceiver dedicated chip, and the processor may be implemented by using a special-purpose processing chip, a processing circuit, or a general-purpose chip.

In another implementation, a general-purpose computer may be used to implement the server provided in this embodiment of this application. That is, program code for implementing functions of the processor, the receiver, and the transmitter is stored in the memory. The general-purpose processor executes the code in the memory to implement the functions of the processor, the receiver, and the transmitter.

An embodiment of this application further provides a computer-readable storage medium, on which a computer program is stored. The computer program is executed by a processor to implement the steps of the fragmented packet traffic rate limiting method or DPU fragmented packet forwarding method described above. The computer-readable storage medium may be a tangible storage medium, such as a random access memory (RAM), a memory, a read-only memory (ROM), an electrically programmable ROM, an electrically erasable programmable ROM, a register, a floppy disk, a hard disk, a removable storage disk, a CD-ROM, or any other form of storage medium known in the art.

A person of ordinary skill in the art may understand that the exemplary components, systems, and methods described with reference to the embodiments disclosed herein may be implemented with hardware, software, or a combination of hardware and software. Specifically, whether the exemplary components, systems, and methods are implemented with hardware or software depends on particular application and design constraints of the technical solution. A person skilled in the art may implement the described functions using different methods for each particular application, but such implementation should not be considered beyond the scope of this application. When the exemplary components, systems, and methods are implemented with hardware, the hardware may be, for example, an electronic circuit, an application-specific integrated circuit (ASIC), appropriate firmware, a plug-in, a function card, or the like. When the exemplary components, systems, and methods are implemented with software, an element in this application is a program or a code segment that is used to execute a required task. The program or the code segment may be stored in a machine-readable medium, or transmitted on a transmission medium or a communication link by using a data signal carried in a carrier.

It should be noted that this application is not limited to the specific configurations and processing described above and shown in the figures. For brevity, a detailed description of a known method is omitted herein. In the foregoing embodiments, several specific steps are described and illustrated as examples. However, the process of the method in this application is not limited to the described and shown specific steps. A person skilled in the art may make various changes, modifications, and additions, or change a sequence between the steps after understanding the spirit of this application.

In this application, features described and/or exemplified in one implementation may be used in one or more other implementations in a same manner or in a similar manner, and/or may be combined with or replace features of other implementations.

The foregoing descriptions are merely preferred embodiments of this application, and are not intended to limit this application. For a person skilled in the art, various modifications or changes may be made to the embodiments of this application. Any modification, equivalent substitution, improvement, and the like made within the spirit and principles of this application should fall within the protection scope of this application.

What is claimed is:

1. A fragmented packet traffic rate limiting method, comprising:

performing pre-coloring processing on a target fragmented packet based on a preset packet fragment coloring table such that the target fragmented packet is provided with a color mark, wherein the color mark comprises: a discarded color and a reserved color;

performing traffic evaluation on opposing pre-colored target fragmented packet based on a color-aware token bucket algorithm to perform secondary coloring processing on the target fragmented packet;

updating the packet fragment coloring table based on the color mark of the target fragmented packet subjected to secondary coloring; and when a current color mark of the target fragmented packet is the discarded color, performing rate limiting processing on the target fragmented packet, or when the current color mark of the target fragmented packet is the reserved color, performing forwarding processing on the target fragmented packet;

wherein before the performing the pre-coloring processing on the target fragmented packet based on the preset packet fragment coloring table, the method further comprises:

creating a packet fragment coloring table used to store a correspondence between an identifier of an original data packet to which a fragmented packet belongs and a color identifier, wherein the identifier of the original data packet comprises a source IP, a destination IP, a protocol type, and a unique identification.

2. The fragmented packet traffic rate limiting method according to claim 1, wherein the performing the pre-coloring processing on the target fragmented packet based on the preset packet fragment coloring table such that the target fragmented packet is provided with the color mark further comprises:

obtaining the identifier of the original data packet to which a currently received target fragmented packet belongs; and searching the packet fragment coloring table to determine whether the packet fragment coloring table comprises the identifier of the original data packet to which the target fragmented packet belongs; and when the packet fragment coloring table comprises the identifier of the original data packet to which the target fragmented packet belongs, performing the pre-coloring processing on the target fragmented packet based on the color mark corresponding to the identifier of the original data packet.

3. The fragmented packet traffic rate limiting method according to claim 2, further comprising:

when the identifier of the original data packet to which the target fragmented packet belongs is not found in the packet fragment coloring table, using the reserved color as a default color to pre-color the target fragmented packet, and storing, in the packet fragment coloring table, a correspondence between the identifier of the original data packet to which the target fragmented packet belongs and the color mark that is the reserved color.

4. The fragmented packet traffic rate limiting method according to claim 1, wherein the performing the traffic evaluation on the pre-colored target fragmented packet based on the color-aware token bucket algorithm to perform the secondary coloring processing on the target fragmented packet, and the updating the packet fragment coloring table based on the color mark of the target fragmented packet subjected to the secondary coloring comprise:

identifying the current color mark of the target fragmented packet based on the color-aware token bucket algorithm;

when it is identified that the color mark of the target fragmented packet is the discarded color, determining that the color mark for the secondary coloring of the target fragmented packet remains unchanged; and when the color mark of the target fragmented packet is the reserved color, determining whether a quantity of tokens in a corresponding token bucket meets a packet length of the target fragmented packet, wherein:

when the quantity of tokens in the corresponding token bucket meets the packet length of the target fragmented packet, determining that the color mark for the secondary coloring of the target fragmented packet remains unchanged, and reducing, in the token bucket, the quantity of tokens that meet the packet length of the target fragmented packet; or when it is determined that the quantity of tokens in the token bucket does not meet the packet length of the target fragmented packet, changing the color mark for the secondary coloring of the target fragmented packet to the discarded color, and updating, in the packet fragment coloring table, the color mark of the original data packet to which the target fragmented packet belongs.

5. The fragmented packet traffic rate limiting method according to claim 1, wherein before the performing the forwarding processing on the target fragmented packet, the method further comprises:

determining whether the target fragmented packet subjected to the traffic evaluation is a last fragmented packet of the original data packet to which the target fragmented packet belongs; and when the target fragmented packet subjected to the traffic evaluation is the last fragmented packet of the original data packet to which the target fragmented packet belongs, deleting a record of the original data packet to which the target fragmented packet belongs from the packet fragment coloring table.

6. A Data Processing Unit (DPU) fragmented packet forwarding method, comprising:

locally receiving a to-be-forwarded target fragmented packet at a DPU; and processing the received target fragmented packet according to a fragmented packet traffic rate limiting method, the fragmented packet traffic rate limiting method comprising:

performing pre-coloring processing on a target fragmented packet based on a preset packet fragment coloring table such that the target fragmented packet is provided with a color mark, wherein the color mark comprises: a discarded color and a reserved color;

performing traffic evaluation on the pre-colored target fragmented packet based on a color-aware token bucket algorithm to perform secondary coloring processing on the target fragmented packet;

updating the packet fragment coloring table based on the color mark of the target fragmented packet subjected to secondary coloring; and when a current color mark of the target fragmented packet is the discarded color, performing rate limiting processing on the target fragmented packet, or when the current color mark of the target fragmented packet is the reserved color, performing forwarding processing on the target fragmented packet;

wherein the packet fragment coloring table is configured to store a correspondence between keyword information of an original data packet to which a fragmented packet belongs and a color identifier, wherein:

the keyword information of the fragmented packet comprises a unique identification and a local flow label; and the local flow label is preset based on an identifier of the original data packet.

7. The DPU fragmented packet forwarding method according to claim 6, wherein before the performing the pre-coloring processing on the target fragmented packet based on the preset packet fragment coloring table, the method further comprises:

creating a packet fragment coloring table used to store a correspondence between an identifier of an original data packet to which a fragmented packet belongs and a color identifier, wherein the identifier of the original data packet comprises a source IP, a destination IP, a protocol type, and a unique identification.

8. The DPU fragmented packet forwarding method according to claim 7, wherein the performing the pre-coloring processing on the target fragmented packet based on the preset packet fragment coloring table such that the target fragmented packet is provided with the color mark further comprises:

obtaining the identifier of the original data packet to which a currently received target fragmented packet belongs; and searching the packet fragment coloring table to determine whether the packet fragment coloring table comprises the identifier of the original data packet to which the target fragmented packet belongs; and when the packet fragment coloring table comprises the identifier of the original data packet to which the target fragmented packet belongs, performing the pre-coloring processing on the target fragmented packet based on the color mark corresponding to the identifier of the original data packet.

9. The DPU fragmented packet forwarding method according to claim 8, further comprising:

when the identifier of the original data packet to which the target fragmented packet belongs is not found in the packet fragment coloring table, using the reserved color as a default color to pre-color the target fragmented packet, and storing, in the packet fragment coloring table, a correspondence between the identifier of the original data packet to which the target fragmented packet belongs and the color mark that is the reserved color.

10. The DPU fragmented packet forwarding method according to claim 6, wherein the performing the traffic evaluation on the pre-colored target fragmented packet based on the color-aware token bucket algorithm to perform the secondary coloring processing on the target fragmented packet, and the updating the packet fragment coloring table based on the color mark of the target fragmented packet subjected to the secondary coloring comprise:

identifying the current color mark of the target fragmented packet based on the color-aware token bucket algorithm;

when it is identified that the color mark of the target fragmented packet is the discarded color, determining that the color mark for the secondary coloring of the target fragmented packet remains unchanged; and when the color mark of the target fragmented packet is the reserved color, determining whether a quantity of tokens in a corresponding token bucket meets a packet length of the target fragmented packet, wherein:

when the quantity of tokens in the corresponding token bucket meets the packet length of the target fragmented packet, determining that the color mark for the secondary coloring of the target fragmented packet remains unchanged, and reducing, in the token bucket, the quantity of tokens that meet the packet length of the target fragmented packet; or when it is determined that the quantity of tokens in the token bucket does not meet the packet length of the target fragmented packet, changing the color mark for the secondary coloring of the target fragmented packet to the discarded color, and updating, in the packet fragment coloring table, the color mark of the original data packet to which the target fragmented packet belongs.

11. The DPU fragmented packet forwarding method according to claim 6, wherein before the performing the forwarding processing on the target fragmented packet, the method further comprises:

determining whether the target fragmented packet subjected to the traffic evaluation is a last fragmented packet of the original data packet to which the target fragmented packet belongs; and when the target fragmented packet subjected to the traffic evaluation is the last fragmented packet of the original data packet to which the target fragmented packet belongs, deleting a record of the original data packet to which the target fragmented packet belongs from the packet fragment coloring table.

12. The DPU fragmented packet forwarding method according to claim 6, wherein the method is implemented by a processor of an electronic device when the processor executes a computer program, the computer program stored in a memory of the electronic device and runnable on the processor.

13. An electronic device, comprising:

a memory;

a processor; and a computer program that is stored in the memory and runnable on the processor, wherein the processor is configured to implement, when executing the computer program, operations of:

performing pre-coloring processing on a target fragmented packet based on a preset packet fragment coloring table such that the target fragmented packet is provided with a color mark, wherein the color mark comprises: a discarded color and a reserved color;

performing traffic evaluation on the pre-colored target fragmented packet based on a color-aware token bucket algorithm to perform secondary coloring processing on the target fragmented packet;

updating the packet fragment coloring table based on the color mark of the target fragmented packet subjected to secondary coloring; and when a current color mark of the target fragmented packet is the discarded color, performing rate limiting processing on the target fragmented packet, or when the current color mark of the target fragmented packet is the reserved color, performing forwarding processing on the target fragmented packet;

wherein the processor is further configured to implement, when executing the computer program, operations of:

before the performing the pre-coloring processing on the target fragmented packet based on the preset packet fragment coloring table, creating a packet fragment coloring table used to store a correspondence between an identifier of an original data packet to which a fragmented packet belongs and a color identifier, wherein the identifier of the original data packet comprises a source IP, a destination IP, a protocol type, and a unique identification.

14. The electronic device according to claim 13, wherein the processor is further configured to implement, when executing the computer program, operations of:

obtaining the identifier of the original data packet to which a currently received target fragmented packet belongs; and searching the packet fragment coloring table to determine whether the packet fragment coloring table comprises the identifier of the original data packet to which the target fragmented packet belongs; and when the packet fragment coloring table comprises the identifier of the original data packet to which the target fragmented packet belongs, performing the pre-coloring processing on the target fragmented packet based on the color mark corresponding to the identifier of the original data packet.

15. The electronic device according to claim 14, wherein the processor is further configured to implement, when executing the computer program, operations of:

when the identifier of the original data packet to which the target fragmented packet belongs is not found in the packet fragment coloring table, using the reserved color as a default color to pre-color the target fragmented packet, and storing, in the packet fragment coloring table, a correspondence between the identifier of the original data packet to which the target fragmented packet belongs and the color mark that is the reserved color.

16. The electronic device according to claim 13, wherein the processor is further configured to implement, when executing the computer program, operations of:

identifying the current color mark of the target fragmented packet based on the color-aware token bucket algorithm;

when it is identified that the color mark of the target fragmented packet is the discarded color, determining that the color mark for the secondary coloring of the target fragmented packet remains unchanged; and when the color mark of the target fragmented packet is the reserved color, determining whether a quantity of tokens in a corresponding token bucket meets a packet length of the target fragmented packet, wherein:

when the quantity of tokens in the corresponding token bucket meets the packet length of the target fragmented packet, determining that the color mark for the secondary coloring of the target fragmented packet remains unchanged, and reducing, in the token bucket, the quantity of tokens that meet the packet length of the target fragmented packet; or when it is determined that the quantity of tokens in the token bucket does not meet the packet length of the target fragmented packet, changing the color mark for the secondary coloring of the target fragmented packet to the discarded color, and updating, in the packet fragment coloring table, the color mark of the original data packet to which the target fragmented packet belongs.

17. The electronic device according to claim 13, wherein the processor is further configured to implement, when executing the computer program, operations of:

before the performing the forwarding processing on the target fragmented packet, determining whether the target fragmented packet subjected to the traffic evaluation is a last fragmented packet of the original data packet to which the target fragmented packet belongs; and when the target fragmented packet subjected to the traffic evaluation is the last fragmented packet of the original data packet to which the target fragmented packet belongs, deleting a record of the original data packet to which the target fragmented packet belongs from the packet fragment coloring table.

* * * * *